May 29, 1962 M. I. BREIER 3,036,537
MATERIALS HANDLING METHOD
Filed April 9, 1957
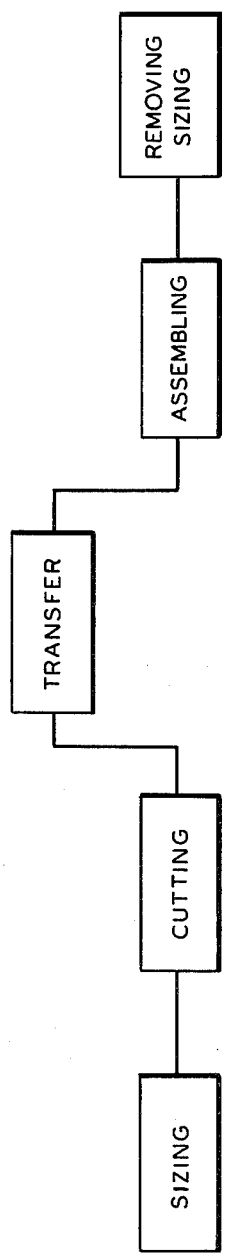
INVENTOR
MARCUS I. BREIER
BY Herman Seid
Robert W. Siddler
ATTORNEYS.

3,036,537
MATERIALS HANDLING METHOD
Marcus I. Breier, 38 McClellan Ave., Amsterdam, N.Y.
Filed Apr. 9, 1957, Ser. No. 651,585
2 Claims. (Cl. 112—262)

This invention relates to a novel method for facilitating the handling of normally flexible sheet materials, such as textile fabrics or the like, more particularly to a method permitting the handling and positioning of such materials by mechanical means, whereby automation production techniques may be employed.

Contemporary technological processes have evolved a variety of materials handling equipment, serving to minimize the need for manual manipulation. In so-called hard goods industries, most fabrication steps have thus been considerably simplified, and costs of production minimized by employing any one of a variety of materials handling apparatus to facilitate fabrication of the hard goods product. On the other hand, though technological advances have unquestionably improved production procedures in so-called soft goods lines, it has been relatively impossible to minimize the requirement for manual handling necessary in the production of soft goods items such as clothing, upholstery products, and the like. The primary difficulties involved in employing some of the presently available automation techniques in the soft goods industries, appear to revolve about the fact that the components of any given soft goods item, such as clothing, due to the flexible nature of the component, must be handled manually in order to insure accurate positioning of the component in combination with other components prior to assembly. Thus, in fabricating an item of clothing, a bolt of cloth is conventionally laid out on a cutting table, an operation which may be carried on with the aid of overhead cranes, or the like. But thereafter, the cutting operation, the assembling of cut components, the distribution of the assembled components to the sewing machine operators, and the feeding of the components through the sewing machine to assemble them into fabricated garments are all hand operations requiring the services of relatively skilled workers.

Even where manual assembly techniques are employed, as is conventionally the case in soft goods industries, problems arise in conjunction with the positioning of the various components of a soft goods item for assembly. These problems are in large part due to the flexible nature of the material of the component, and the fact that there is a tendency for the material to stretch. Thus, in forming multi-ply items such as collars, or the like, the super-positioning of one ply on another, even though performed manually, is considerably more time consuming and thus, more costly than would be the case in the fabrication of multi-ply hard goods items.

It is with the above problems in mind that the present method has been evolved, a method permitting the use of the materials handling techniques of hard goods industries, in the fabrication of soft goods items.

It is accordingly a primary object of this invention to provide an improved materials handling technique for use in soft goods industries.

A further object of the invention is to provide a method facilitating the handling of porous sheet materials such as textile fabrics.

An additional object of the invention is to provide an improved materials handling method for textile fabrics, serving to permit the use of conventional hard goods automation techniques in the fabrication of soft goods items from said fabrics.

It is also an important object of this invention to provide a materials handling method for the handling of sheet materials such as textiles which will serve to substantially minimize the costs of production of items fabricated from said materials.

A still further object of the invention is to provide a method for facilitating the handling of any normally flexible material, whether textile fabric, sheet plastic, porous or non-porous.

These and other objects of the invention, which will be made most manifest and particularly pointed out in the following specification and claims, are achieved by temporarily stiffening the flexible material by the employ of conventional sizings or the like. Thereafter, the stiffened material is handled by employing conventional hard goods materials handling techniques for shaping and assembling the stiffened material. After assembly, the stiffening is removed.

The single FIGURE of the drawing is a flow diagram illustrating the steps of the material handling method.

In its broadest aspects, the gist of this invention resides in the temporary conversion of a pliable soft goods material such as textile fabric, or the like, to the condition of a relatively rigid hard goods material, such as sheet metal, or the like. This temporary conversion is accomplished most economically by employing an impregnating soluble sizing, a soluble stiffening coating, or other stiffening agent, to make the material substantially rigid prior to fabrication of a soft goods item from said material. Conventional stiffening techniques may be employed, using either starch solutions, shellac, or any of the myriad soluble compounds available for stiffening pliable soft goods material. Thereafter, the stiffened material is handled either manually, or by employing any one of a variety of materials handling techniques, to facilitate formation of the soft goods material into a final article. Once the final article is assembled, the stiffening agent is removed.

In its simplest form, the invention has been found most applicable as a means of facilitating a purely manual assembly operation employed in forming a soft goods article. Thus, it has been found that by sizing a textile fabric, or temporarily deplasticizing a plastic material, the stiffness imparted to the material makes the material more readily subject to manual handling. After assembly, the material is returned to its soft goods state by removal of the stiffening agent, or by replasticizing.

The instant invention has particular applicability in the fabrication of articles from textile materials. Where textile materials are employed, the flexibility of the material, and its tendency to stretch, ordinarily requires careful manual manipulation by an operator during the assembly of this textile material into a finished article. By employing the teaching of this invention, the facility of assembly of any article from a textile material may be considerably increased. With textile materials, a temporary stiffening may be most readily accomplished by employing a soluble sizing such as starch, or shellac, or a mixture of these. The textile material is temporarily stiffened so as to permit ready manipulation by either mechanical means or manually. The stiffened material is then assembled, employing conventional assembly techniques for relatively rigid sheet materials, and after assembly, the stiffening agent is removed either by dipping the assembled article into a solvent, by spraying with a sizing solvent, or any other suitable means serving to remove the sizing to the extent required to place the article in a condition suitable for normal use.

The instant inventive concept may also be applied in the fabrication of articles of manufacture from sheet plastics. As noted, the inventive method comprises the steps of temporarily stiffening, fabricating, and removal of the stiffening agent. As applied to conventional sheet plastics, the temporary stiffening may be accomplished by use of common deplasticizing techniques, such as cooling, or in the case of urea or vinyl type plastics, the use of deplasticizing agents such as carbon tetrachloride or Stoddard's solution. The temparily stiffened sheet plastic is then fabricated into an article of manufacture by employing any of the materials handling techniques presently employed in the handling of rigid sheet materials. After assembly, the final article of manufacture is replasticized to soften the article and place it in a condition suitable for normal use.

By way of illustration, the novel method will be described as employed in the formation of a multi-layer structure such as a collar, as conventionally employed on a garment. Conventional collar forming techniques require that a bolt of cloth be laid out on a cutting table, that the various layers comprising the collar be cut from this bolt (or bolts, as the case may be), and that the various layers of material be superimposed one on the other, after which they are sewn together. The cutting, the superpositioning of the layers, and the final assembly may be, and are generally, accomplished by an operator. Where the textile fabric employed remains in its original pliable form, the operator continually encounters difficulties arising from the tendency for the material to bunch, or stretch. By employing the novel features of this invention, these difficulties can be overcome. Thus, the manual assembly operation can be improved by first stiffening the textile material by treating same with a conventional sizing such as starch, shellac, or any compound of these. The stiffened material is thereafter more readily cut, handled during the superpositioning operation, and fed through the sewing machine for final assembly. After assembly, the sizing is removed to return the assembled collar to its natural textile state.

Further by way of example, the method of this invention may be employed to facilitate the manufacture of multi-layer articles comprising normally pliable sheet plastics (or combinations of sheet plastics and textile fabrics). Thus, where wall coverings or upholstery materials are formed of an outer decorative surface sheet, and a noramlly hidden backing sheet, these sheets may more readily be handled for fabrication into the unit material by first temporarily stiffening the component sheets, then assemblying the sheets, and thereafter replasticizing the sheet material to return it to its initial pliable condition. The second step relating to the formation of the sheet material may also include the cutting of this material to any desired shape. The stiffening of the plastic material may be accomplished in a variety of ways, dependent on the type of sheet plastic involved. As previously noted, this may be done by cooling the material or by treating same with a suitable deplasticizing agent. The assembly operation, depending on the end product desired, may involve mere super-positioning of one layer upon the other, or additionally include forming steps for shaping the material into a desired shape, as for example, in upholstery operations where the sheet plastic is cut to desired size and shape.

The invention has above been described as facilitating the manual handling of pliable materials; however, a primary feature resides in the fact that it may serve to permit the use of automation techniques in the manufacture of soft goods articles such as clothing, or the like.

Thus by way of example, an automatic collar forming installation may be provided which will permit the manufacture of articles such as collars, by purely mechanical means. Here, the stiffened material, after being laid out on a cutting table, may be cut into desired shape by employing metal stamping techniques, or by employing planograph controlled cutters to follow a given template. After the temporarily stiffened material is cut to shape, a variety of handling apparatus may be employed to lift and transfer the cut material from the table to the point of assembly. In a preferred arrangement, suction cup transfer devices of the type shown in Patent 1,737,401 have been employed for this purpose. Upon being transferred and super-posed in position for assembly, the super-posed layers of material are joined by using automatic sewing machines which may be controlled by a planograph linkage to follow the desired outline of stitching. Upon completion of the assembly, the collar formed from temporarily stiffened textile material, is treated to remove any undesirable sizing, and is ready for use.

It is thus seen that a novel method has been provided facilitating the fabrication of articles of manufacture in the so-called soft goods lines, which permits the use of manufacturing techniques of the hard goods lines, with the resultant increase in efficiency of production. The novel method, by temporarily stiffening the material, eliminates conventionally encountered handling difficulties, and besides facilitating manual assembly operations, permits relatively automatic mechanical handling means to be employed.

The above disclosure has been given by way of illustration and elucidation, and not by way of limitation, and it is desired to protect all embodiments of the herein disclosed inventive concept, within the scope of the appended claims.

What is claimed is:

1. The method of fabricating a multi-component article from textile material, said method comprising the steps of: sizing the material to be fabricated to make it relatively rigid and non-porous; cutting the material to form the components; transferring each component by means of a suction transfer device to a point of assembly, with each component arranged in position for assembly; joining the components; and thereafter removing the sizing.

2. A method of fabricating a garment collar from textile material, said method comprising the steps of: sizing the material to be fabricated to make it relatively rigid and non-porous; cutting the material to form the collar components; transferring each component by means of a suction transfer device to a point of assembly; superpositioning the components; stitching the superpositioned components; and thereafter removing enough of the sizing to place the collar in condition for use.

References Cited in the file of this patent

UNITED STATES PATENTS

| | | |
|---|---|---|
| 795,150 | Miller | July 18, 1905 |
| 1,862,633 | Ramsay | June 14, 1932 |
| 2,005,493 | Blackwell | June 18, 1935 |
| 2,040,354 | Wittcoff | May 12, 1936 |
| 2,040,784 | Bodmer | May 12, 1936 |
| 2,167,215 | Leary | July 25, 1939 |
| 2,203,937 | Barley | June 11, 1940 |
| 2,444,381 | Sperber | June 29, 1948 |
| 2,461,430 | Mack | Feb. 8, 1949 |
| 2,479,609 | Fouch et al. | Aug. 23, 1949 |
| 2,730,787 | Bechtold | Jan. 17, 1956 |
| 2,807,865 | Shippee et al. | Oct. 1, 1957 |